United States Patent
Kim et al.

(10) Patent No.: US 9,288,495 B2
(45) Date of Patent: Mar. 15, 2016

(54) ADAPTIVE SECONDARY PREDICTION-BASED IMAGE ENCODING/DECODING METHOD, DEVICE AND RECORDING MEDIUM

(75) Inventors: Sunyeon Kim, Seoul (KR); Jeongyeon Lim, Gyeonggi-do (KR); Gyumin Lee, Gyeonggi-do (KR); Jaehoon Choi, Gyeonggi-do (KR); Yungho Choi, Gyeonggi-do (KR); Yoonsik Choe, Gyeonggi-do (KR); Yonggoo Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 966 days.

(21) Appl. No.: 13/511,347

(22) PCT Filed: Nov. 24, 2010

(86) PCT No.: PCT/KR2010/008316
§ 371 (c)(1),
(2), (4) Date: Aug. 10, 2012

(87) PCT Pub. No.: WO2011/065735
PCT Pub. Date: Jun. 3, 2011

(65) Prior Publication Data
US 2012/0307906 A1 Dec. 6, 2012

(30) Foreign Application Priority Data

Nov. 24, 2009 (KR) .................. 10-2009-0113625
Nov. 24, 2010 (KR) .................. 10-2010-0117198

(51) Int. Cl.
*H04N 7/28* (2006.01)
*H04N 19/12* (2014.01)
(Continued)

(52) U.S. Cl.
CPC ............. *H04N 19/12* (2014.11); *H04N 19/103* (2014.11); *H04N 19/147* (2014.11); *H04N 19/176* (2014.11); *H04N 19/46* (2014.11); *H04N 19/51* (2014.11)

(58) Field of Classification Search
CPC ... H04N 19/103; H04N 19/12; H04N 19/147; H04N 19/176; H04N 19/46; H04N 19/51
See application file for complete search history.

(56) References Cited

U.S. PATENT DOCUMENTS

2010/0329342 A1* 12/2010 Joshi ................ H04N 19/00672
375/240.16

FOREIGN PATENT DOCUMENTS

| KR | 10-2004-0028334 | 4/2004 |
| KR | 10-2007-0006446 | 1/2007 |
| KR | 10-2008-0082143 | 9/2008 |

OTHER PUBLICATIONS
International Search Report mailed Jun. 29, 2011 for PCT/KR2010/008316.

*Primary Examiner* — Andy Rao
*Assistant Examiner* — Tyler Edwards
(74) *Attorney, Agent, or Firm* — Hauptman Ham, LLP

(57) ABSTRACT

The present disclosure provides a video encoding/decoding method including: selectively frequency transforming a first residual block generated by subtracting a predicted block from a current block, generating a first quantized block for the first residual block or the frequency transformed first residual block, generating a second quantized block, if the first quantized block is a quantized first residual block from quantizing the first residual block, through selectively performing a secondary prediction on the quantized first residual block by using a secondary predicted motion vector set, encoding information on whether the frequency transforming is performed and selectively encoding information on the secondary prediction, encoding the first quantized block or the second quantized block into a bitstream, and decoding the same.

17 Claims, 8 Drawing Sheets

(51) Int. Cl.
*H04N 19/176* (2014.01)
*H04N 19/147* (2014.01)
*H04N 19/46* (2014.01)
*H04N 19/51* (2014.01)
*H04N 19/103* (2014.01)

|  | Binary Data |
|---|---|
| Encode Frequency Domain | 00 |
| Encode Spatial Domain, Perform No Secondary Prediction | 01 |
| Perform Secondary Prediction ($MV_1$) | 10 |
| Perform Secondary Prediction ($MV_2$) | 11 |

*FIG. 5*

ADAPTIVE SECONDARY PREDICTION-BASED IMAGE ENCODING/DECODING METHOD, DEVICE AND RECORDING MEDIUM

CROSS REFERENCE TO RELATED APPLICATION

This application claims the priority of Korean Patent application No. 10-12009-0113625, filed Nov. 24, 2009, and Korean Patent application No. 10-2010-0117198, filed on Nov. 24, 2010 in the KIPO (Korean Intellectual Property Office). Further, this application is the National Phase application of International Application No. PCT/KR2010/008316 filed Nov. 24, 2010, which designates the United States and was published in Korean.

TECHNICAL FIELD

The present disclosure relates to video data compression technology. More particularly, the present disclosure relates to an adaptive secondary prediction-based video encoding/decoding method, apparatus, and a recording medium for reducing prediction errors by adaptively performing the secondary prediction by using one or more motion vectors of a reference block in performing an adaptive prediction error coding using an adaptive frequency transform.

BACKGROUND

The statements in this section merely provide background information related to the present disclosure and may not constitute the prior art.

Generally speaking, development of video compression technologies has established the foundation for utilizing visual media more effectively. In particular, the H.264/AVC video encoding technology shows the improved compression efficiency which is double that of existing standards. The 264/AVC video encoding technology provides an encoding process in temporal and spatial domains based on a hybrid encoding technique. In the encoding process at the temporal domain, temporal redundancy is reduced through a motion compensated prediction from an image of a reference frame. The motion compensated prediction is determined by a correlation, i.e. a motion vector, between a block of the reference frame and a block of an image to be currently encoded and a predicted image in the unit of blocks is obtained through the motion compensated prediction. Prediction errors obtained by calculating a difference between the predicted image and an original image are arranged in the unit of blocks, transformed into a frequency domain, quantized, and scanned from a coefficient indicating a DC value according to a zigzag scanning method. Through the zigzag scanning, a coefficient array is generated and a subsequent encoding process may be optimized through a Context-based Adaptive Binary Arithmetic Coding (CABAC) or a Context Adaptive Variable Length Coding (CAVLC). However, although the high encoding efficiency by the DCT transform for transforming the prediction errors into the frequency domain can be obtained only when the prediction errors within a block have correlation, i.e. exist in a low frequency band, the encoding efficiency is low when the prediction errors have a low correlation in a spatial domain.

In order to solve the above mentioned problem, there is proposed a method in which a process of encoding a prediction error in a spatial domain without performing a DCT transform is added to a conventional method of encoding a prediction error in a frequency domain, so that it can be adaptively determined whether to transform a prediction error signal into a frequency domain or maintain the prediction error signal in a spatial domain for encoding.

FIG. 1 is a flowchart illustrating a conventional method of adaptively encoding a prediction error.

First, a prediction error signal of an image to be encoded through a motion compensated prediction is obtained (S101).

A Rate-Distortion (RD) cost in a frequency domain is calculated based on distortion and a demanded rate by DCT transforming and quantizing the prediction error obtained in step S101 and inversely quantizing and DCT transforming the quantized prediction error again (S102).

A cost in a spatial domain is calculated based on the distortion and the demanded rate by quantizing the predicted error obtained in step S101 and then inversely quantizing the quantized prediction error (S103).

Finally, a prediction error signal is encoded by comparing the cost in the frequency domain calculated in step S102 and the cost in the spatial domain calculated in step S103 and selecting an encoding method requiring the lower cost (S104).

It is premised that the method as shown in FIG. 1 without the performance of the DCT transform is more effective than with the performance of the DCT transform.

The technique for encoding a prediction error signal with the method of FIG. 1 shows better encoding performance compared to that of the H.264/AVC video encoding technique. However, when there are large errors and small errors irregularly dispersed, as well as a correlation between predicted error samples within a block is low in a spatial domain, the efficiency of the aforementioned method is deteriorated.

DISCLOSURE

Technical Problem

Therefore, to solve the above-mentioned problems, the present disclosure seeks to reduce prediction errors by adaptively performing a is secondary prediction by using one or more motion vectors of a reference block in performing an error coding by using an adaptive frequency transform.

SUMMARY

An embodiment of the present disclosure provides a video encoding/decoding apparatus, including: a video encoder for generating a predicted block by predicting a current block, generating a first residual block by subtracting the predicted block from the current block, selectively frequency transforming the first residual block into a frequency transformed first residual block, generating a first quantized block for the first residual block or the frequency transformed first residual block, generating a second quantized block, if the first quantized block is a quantized first residual block from quantizing the first residual block, by selectively performing a secondary prediction on the quantized first residual block by using a secondary predicted motion vector set, encoding an information on whether the frequency transforming is performed and selectively an information on the secondary prediction, and encoding the first quantized block or the second quantized block into a bitstream; and a video decoder for decoding a quantized block, an information on whether a frequency transform is performed and an information related to a secondary prediction from a bitstream, reconstructing a residual block from the quantized block by using the information on whether the frequency transform is performed, an information on whether the secondary prediction is performed and an information on a secondary predicted motion vector within the information related to the secondary prediction, generating a predicted block by predicting a current block, and reconstructing the current block by adding a reconstructed residual block and the predicted block.

Another embodiment of the present disclosure provides a video encoding apparatus, including: a predictor for generating a predicted block by predicting a current block; a first residual block generator for generating a first residual block by subtracting the predicted block from the current block; an adaptive transform-quantization unit for selectively frequency transforming the first residual block into a frequency transformed first residual block and generating a first quantized block for the first residual block or the frequency transformed first residual block; a second residual block generator for generating a second quantized block, if the first quantized block is a quantized first residual block from quantizing the first residual block, by selectively performing a secondary prediction on the quantized first residual block by using a secondary predicted motion vector set; and an encoder for encoding an information on whether the frequency transforming is performed and selectively encoding an information on the secondary prediction, and encoding the first quantized block or the second quantized block.

The adaptive transform-quantization unit includes: an adaptive transform determiner for adaptively determining whether to encode the first residual block into a frequency domain or a spatial domain; a spatial domain quantizer for generating the first quantized block by quantizing the first residual block into the spatial domain as determined; and a transform-quantization unit for generating the first quantized block by performing a frequency transform and a quantization on the first residual block into the frequency domain as determined.

A determination may be made on whether the frequency transforming is performed and whether the secondary prediction is performed, by using a rate-distortion cost (RD cost).

A determination may be made whether the secondary prediction is performed when a first quantized block in a spatial domain of a block of a previous frame is different from a first quantized block in a spatial domain of the current block by a smallest amount which is less than the first quantized block in the spatial domain of the current block.

The information on the secondary prediction may contain information on whether the secondary prediction is performed and information on a motion vector used for the secondary prediction.

The information on whether the frequency transform is performed, the information on whether the secondary prediction is performed, and the information on the motion vector used for the secondary prediction may be combined together into a binary data and encoded.

The motion vector used for the secondary prediction may be an optimal motion vector selected from the secondary predicted motion vector set.

The secondary predicted motion vector set may include one or more of a motion vector of the current block, motion vectors of neighboring blocks of the current block, an average of the motion vectors of the neighboring blocks of the current block, a motion vector of a previous frame at an identical position to a position of the current block, and a maximum probability motion vector.

Yet another embodiment of the present disclosure provides a video decoding apparatus, including: a decoder for decoding a quantized block, an information on whether a frequency transform is performed, and an information related to a secondary prediction from a bitstream; a residual block reconstructer for reconstructing a residual block from the quantized block by using the information on whether the frequency transform is performed, an information on whether the secondary prediction is performed and an information on a secondary predicted motion vector, both information being contained in the information related to the secondary prediction; a predictor for generating a predicted block by predicting a current block; and an adder for adding a reconstructed residual block and the predicted block to reconstruct the current block.

The residual block reconstructer may perform inversely quantizing and inversely transforming on the quantized block if the information on whether the frequency transform is performed means a "frequency domain encoding", inversely quantizing on the quantized block if the information on whether the frequency transform is performed means "a spatial domain encoding" and the information on whether the secondary prediction is performed within the information related to the secondary prediction means a "non-performance of the secondary prediction", and decoding of the information on the secondary predicted motion vector within the information related to the secondary prediction if the information on whether the frequency transform is performed means the "spatial domain encoding" and the information on whether the secondary prediction is performed within the information related to the secondary prediction means a "performance of the secondary prediction", thereby reconstructing and inversely quantizing a quantized first residual block from the quantized block by using the secondary predicted motion vector to reconstruct the residual block.

The information on whether the frequency transform is performed, the information on whether the secondary prediction is performed, and information on the motion vector used for the secondary prediction may be combined together, encoded into a binary data, and included in the bitstream.

The secondary predicted motion vector may be one of a motion vector of the current block, motion vectors of neighboring blocks of the current block, an average of the motion vectors of the neighboring blocks of the current block, a motion vector of a previous frame at an identical position to a position of the current block, and a maximum probability motion vector.

Yet another embodiment of the present disclosure provides a video encoding/decoding method, including: encoding a video by generating a predicted block by predicting a current block, generating a first residual block by subtracting the predicted block from the current block, selectively frequency transforming the first residual block into a frequency transformed first residual block, generating a first quantized block for the first residual block or the frequency transformed first residual block, generating a second quantized block, if the first quantized block is a quantized first residual block from quantizing the first residual block, by selectively performing a secondary prediction on the quantized first residual block by using a secondary predicted motion vector set, encoding an information on whether the frequency transforming is performed and selectively an information on the secondary prediction, and encoding the first quantized block or the second quantized block into a bitstream; and decoding a video by decoding a quantized block, an information on whether a frequency transform is performed and an information related to a secondary prediction from a bitstream, reconstructing a residual block from the quantized block by using the information on whether the frequency transform is performed, an information on whether the secondary prediction is performed and an information on a secondary predicted motion vector within the information related to the secondary prediction, generating a predicted block by predicting a current block, and reconstructing the current block by adding a reconstructed residual block and the predicted block.

Yet another embodiment of the present disclosure provides a video encoding method, including: performing a prediction by generating a predicted block through a prediction of a current block; generating a first residual block by subtracting the predicted block from the current block; performing an adaptive transform-quantization by selectively frequency transforming the first residual block into a frequency transformed first residual block and generating a first quantized block for the first residual block or the frequency transformed first residual block; generating a second residual block by generating a second quantized block, if the first quantized block is a quantized first residual block from quantizing the first residual block, through selectively performing a secondary prediction on the quantized first residual block by using a secondary predicted motion vector set; and encoding an information on whether the frequency transforming is performed and selectively encoding an information on the secondary prediction, and encoding the first quantized block or the second quantized block.

Yet another embodiment of the present disclosure provides a video decoding method, including: decoding a quantized block, an information on whether a frequency transform is performed, and an information related to a secondary prediction from a bitstream; reconstructing a residual block from the quantized block by using the information on whether the frequency transform is performed, an information on whether the secondary prediction is performed and an information on a secondary predicted motion vector, both information being contained in the information related to the secondary prediction; performing a prediction by generating a predicted block by predicting a current block; and adding a reconstructed residual block and the predicted block to reconstruct the current block.

ADVANTAGEOUS EFFECTS

As described above, according to the embodiment of the present disclosure, in prediction of a current block of an image from a reference block and encoding and decoding the current block, the present disclosure adaptively and selectively performs a secondary prediction by using a predicted error of a previously encoded block and thus minimizes a value of a generated residual signal in a case of an encoding into a spatial domain, as well as generates a residual signal and then determines whether to adaptively perform a frequency transform, thereby improving the compression efficiency and thus improving an subjective/objective image quality.

DESCRIPTION OF DRAWINGS

FIG. 5 illustrates an example of generation of a binary data from an information on whether a frequency transform is performed, an information on whether a secondary prediction is performed, and an information on a motion vector used for the secondary prediction;

DETAILED DESCRIPTION

A video encoding apparatus or a video decoding apparatus described hereinafter may be a user's terminal including a personal computer or PC, notebook laptop computer, personal digital assistant or PDA, portable multimedia player or PMP, PlayStation Portable or PSP, or mobile communication terminal, smart phone, television, or such devices, or a server terminal including an application server and a service server, and represent a variety of apparatuses equipped with, for example, a communication device such as a modem for carrying out communication between various devices or wired/wireless communication networks, a memory for storing various programs for encoding or decoding videos or performing an inter-prediction or intra-prediction for encoding or decoding and related data, and a microprocessor for executing the programs to effect operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

A video may typically include a series of pictures each of which is divided into predetermined areas, such as blocks. When each picture is divided into blocks, each of the blocks is classified into an intra block or an inter block depending on an encoding method. The intra block means the block that is encoded through an intra prediction encoding which is within a current picture where the current encoding is performed for generating a predicted block by predicting a current block by using pixels of a reconstructed block that underwent previous encoding and decoding and then encoding the differential value of the predicted block from the pixels of the current block. The inter block means the block that is encoded through an inter prediction encoding which generates the predicted block by predicting the current block in the current picture through referencing one or more past pictures or future pictures and then encoding the differential value of the predicted block from the current block. Here, the frame that is referenced in encoding or decoding the current picture is called a reference frame.

Figure 1:
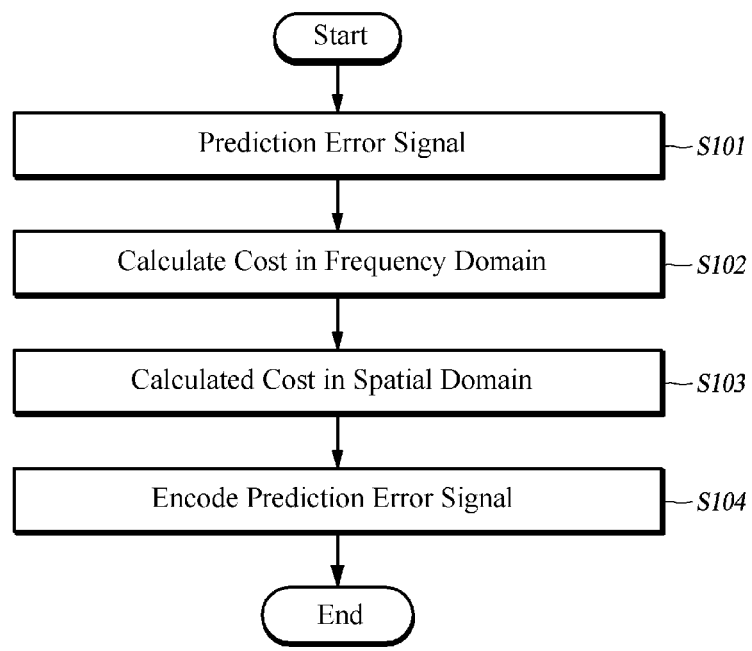
FIG. 1 is a flowchart illustrating a method of adaptively encoding prediction errors according to a conventional art.
Figure 2:
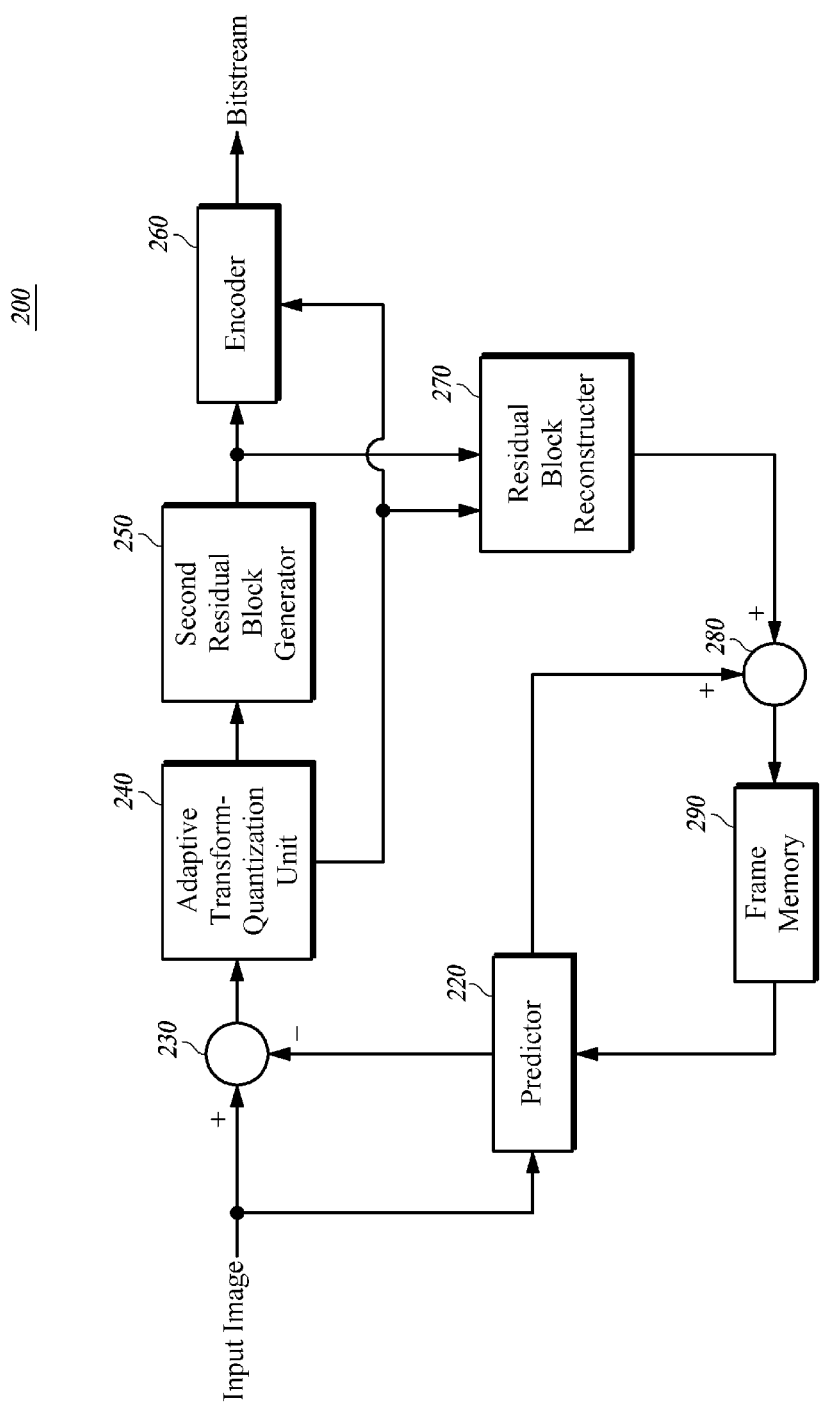
FIG. 2 is a block diagram illustrating a video encoding apparatus according to an embodiment of the present disclosure.

FIG. 2 is a schematic block diagram illustrating a video encoding apparatus 200 according to an embodiment of the present disclosure.

As illustrated in FIG. 2, the video encoding apparatus 200 according to the embodiment of the present disclosure includes a predictor 220, a first residual block generator 230, an adaptive transform-quantization unit 240, a second residual block generator 250, an encoder 260, a residual block reconstructer 270, an adder 280, and a frame memory 290.

An input image may be input in the unit of macro blocks, and the macro block may have a form of M×N blocks, and M and N may be the same or different in the present disclosure.

The predictor 120 generates a motion compensated block and a motion vector by estimating and compensating for a motion of a current block of an image. The predictor 110 generates a predicted block having a predicted pixel value of each pixel by predicting a pixel value of each pixel of the current block to be encoded of the image. Here, the predictor 120 may predict the current block by using an intra prediction or an inter prediction. The predictor 120 may generate a motion vector in a case of using the inter prediction.

The first residual block generator 230 generates a first residual block having a residual signal by calculating a difference between the pixel value of the current block to be encoded and a pixel block of a predicted block.

The adaptive transform-quantization unit 240 selectively frequency transforms a first residual block and generates a first quantized block for the first residual block or a frequency transformed first residual block.

Figure 3:
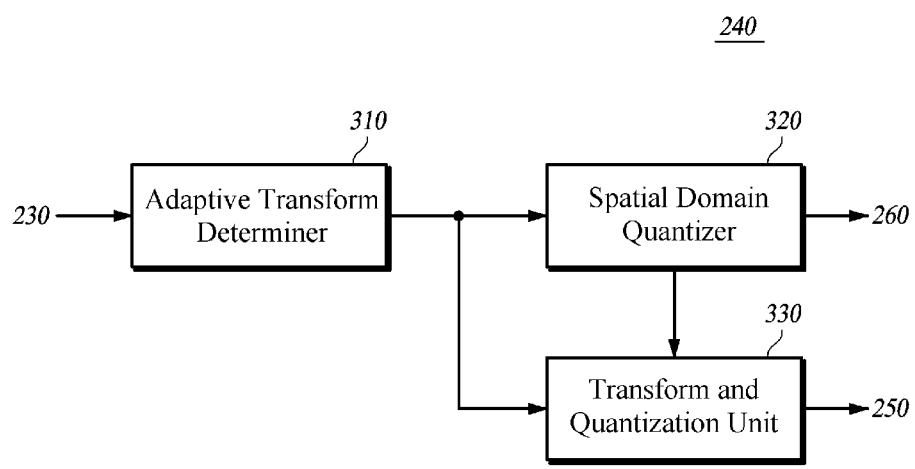
FIG. 3 is a block diagram schematically illustrating an adaptive transform-quantization unit according to an embodiment of the present disclosure.

FIG. 3 is a block diagram schematically illustrating an adaptive transform-quantization unit 240 according to an embodiment of the present disclosure.

In FIG. 3, the adaptive transform-quantization unit 240 includes an adaptive transform determiner 310 for adaptively determining whether to encode the first residual block into a frequency domain or a spatial domain, a spatial domain quantizer 320 for generating a first quantized block by quantizing the first residual block into the spatial domain as determined by the adaptive transform determiner 310, and a transform-quantization unit 330 for generating the first quantized block by performing a frequency transform and a quantization on the first residual block into the frequency domain according to the determination of the adaptive transform determiner 310.

The adaptive transform determiner 310 determines whether to encode the first residual block generated in the first residual block generator 230 into the frequency domain (i.e. encode the first residual block generated in the first residual block generator 230 through the frequency transform and the quantization) or into the spatial domain (i.e. only encode the first residual block generated in the first residual block generator 230 without the frequency transform) by using a Rate-Distortion cost (RD cost), to select a method having the optimum encoding efficiency. When an encoding cost in the frequency domain is smaller than that in the spatial domain, the adaptive transform determiner 310 determines to encode the first residual block in the frequency domain, but when an encoding cost in the frequency domain is equal to or higher than that in the spatial domain, the adaptive transform determiner 310 determines to encode the first residual block in the spatial domain.

The spatial domain quantizer 320 generates the first quantized block by quantizing the first residual block when the adaptive transform determiner 310 determines to encode the first residual block in the spatial domain.

The transform and quantization unit 330 generates the first quantized block by frequency transforming and then quantizing the first residual block when the adaptive transform determiner 310 determines to encode the first residual block in the frequency domain. Here, the transform and quantization unit 330 may transform a residual signal into a frequency domain by using various transform methods, such as a Discrete Cosine Transform (DCT Transform) or a wavelet transform, for transforming a video signal in a time axis into a frequency axis.

Further, the transform and quantization unit 330 quantizes a residual signal (i.e. a frequency transformed block) which has been transformed into the frequency domain after the frequency transform. The quantization method may use various quantization techniques including a Dead Zone Uniform Threshold Quantization (DZUTQ) or a Quantization Weighted Matrix).

The second residual block generator 250 may generate a second quantized block by selectively performing a secondary prediction by using a secondary predicted motion vector set on a quantized first residual block when the first quantized block is generated by the spatial domain quantizer 320 (i.e. the first residual block is quantized without the frequency transform). Here, the secondary predicted motion vector set may include one or more of a motion vector of the current block, motion vectors of one or more neighboring blocks of the current block, an average of motion vectors of the neighboring blocks of the current block, a motion vector of a previous frame at the same position as that of the current block, and a maximum probability motion vector. However, the type of the secondary predicted motion vector included in the secondary predicted motion vector set usable in the present disclosure is not limited thereto, and the second quantized block may be generated using various motion vectors of a block which has been decoded and stored after a previous encoding.

Figure 4:
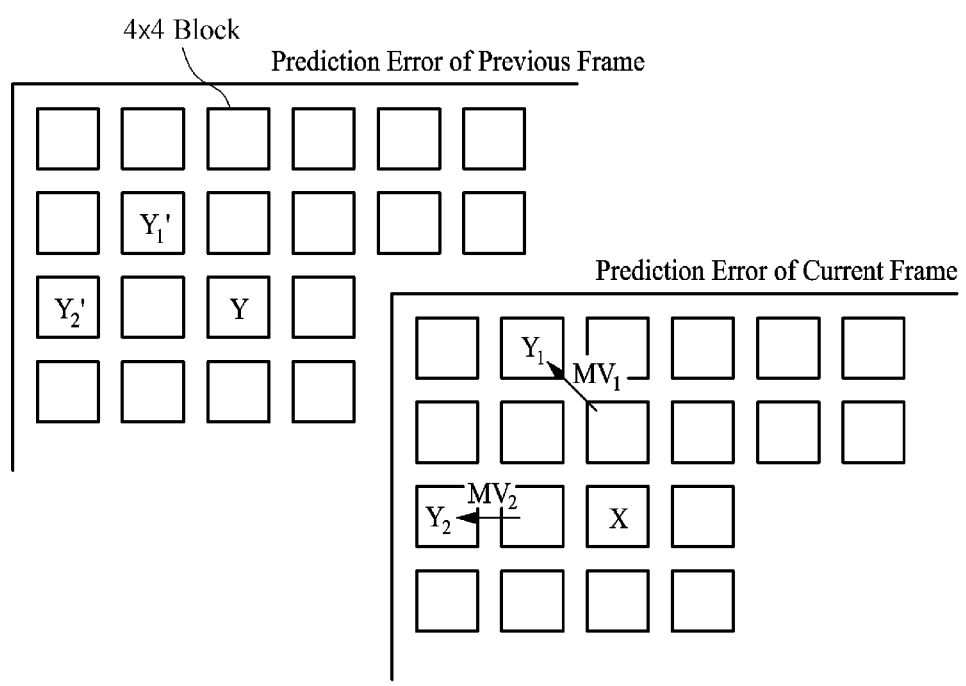
FIG. 4 illustrates an example of a secondary prediction method.

FIG. 4 illustrates an example of a secondary prediction method.

As illustrated in FIG. 4, it is assumed that the secondary predicted motion vectors included in the secondary predicted motion vector set are a motion vector $MV_1$ of an upper-side block of the current block and a motion vector $MV_2$ of a left-side block of the current block. In this event, the second residual block generator 250 compares an encoding cost of an encoding without performance of the secondary prediction, an encoding cost of an encoding of a difference between a quantized predicted error $Y1'$ of a block of a previous frame at a position indicated by $MV_1$ and a quantized predicted error (i.e. the first quantized block X) of the current block, and an encoding cost of an encoding of a difference between a quantized predicted error $Y2'$ of a block of a previous frame at a position indicated by $MV_2$ and the quantized predicted error X of the current block by using the RD cost, to select a case showing the higher efficiency. When the second residual block generator 250 determines that the encoding of the difference between the quantized predicted error of the block of the previous frame at the position indicated by $MV_1$ and the quantized predicted error X of the current block is more efficient, the second residual block generator 250 calculates a difference between the first quantized block and a quantized predicted error of the block of the previous frame at the position indicated by $MV_1$ by performing the secondary prediction, to generate the second quantized block. If the second residual block generator 250 determines that the encoding of the first quantized block of the current block is more efficient, the second quantized block is not generated. In the meantime, in the performance of the secondary prediction, determination on whether the secondary prediction is performed is not determined according to the most optimum RD cost, but it may be simply determined that the secondary prediction is performed when a difference between a first quantized block in a spatial domain of a block of a previous frame and the first quantized block in the spatial domain of the current block is smallest. It is a matter of course that when a case does not exist in which the first quantized block in the spatial domain of the block of the previous frame to which a specific motion vector refers is smaller than the first quantized block in the spatial domain of the current block, the secondary prediction may not be performed.

The encoder 260 encodes information on whether the frequency transform is performed and selectively encodes secondary prediction information, and encodes the first quantized block when the secondary prediction is not performed and the second quantized block when the secondary prediction is performed. When it is determined that the frequency transform is performed in the generation of the first quantized block and when it is determined that the frequency transform is not performed in the generation of the first quantized block but the secondary prediction is not performed, the encoder 260 encodes the information on whether the frequency transform is performed, and when it is determined that the frequency transform is not performed in the generation of the first quantized block but the secondary prediction is performed, the encoder 260 encodes the information on whether the frequency transform is performed and the information on the secondary prediction. Here, the secondary prediction information may contain information on whether the secondary prediction is performed and information on the motion vector ($MV_1$ or $MV_2$) used for the secondary prediction.

FIG. 5 illustrates an example of generation of binary data from the information on whether the frequency transform is performed, the information on whether the secondary prediction is performed, and the information on the motion vector which was used for the secondary prediction.

As illustrated in FIG. 5, the information on whether the frequency transform is performed, the information on whether the secondary prediction is performed, and the information on the motion vector used for the secondary prediction may be combined, to be generated as binary data and encoded. That is, binary data generated when the encoding is performed into the frequency domain may be set as 00, binary data generated when the encoding is performed into the spatial domain but the secondary prediction is not performed may be set as 01, binary data generated when the encoding is performed into the spatial domain and the secondary prediction is performed using $MV_1$ may be set as 10, and binary data generated when the encoding is performed into the spatial domain and the secondary prediction is performed using $MV_2$ may be set as 11.

The encoder 260 encodes the information on whether the frequency transform is performed, the secondary prediction information, the first quantized block, and the second quantized block into a bitstream. The encoding may use an entropy encoding scheme, but it is not essentially limited thereto and may use other various encoding methods.

Further, the encoder 260 may insert not only an encoded bitstream of quantized frequency coefficients but also various information necessary for decoding the encoded bitstream in encoded data. The encoded data may include a field including an encoded bitstream of a Coded Block Pattern (CBP), a delta quantization parameter, and a quantization frequency coefficient and a field including a bit for an information (e.g. an intra prediction mode in a case of the intra prediction or a motion vector in a case of the inter prediction) necessary for the prediction.

The residual block reconstructer 270 reconstructs the residual block from the first quantized block or the second quantized block according to the information on whether the frequency transform is performed and the information related to the secondary prediction. Specifically, when the first quantized block is frequency transformed, the residual block reconstructer 270 reconstructs the residual block by inversely quantizing and inversely transforming the transformed and quantized residual block (that is, the first quantized block). Here, the inverse quantization and the inverse transform may be operated by inversely performing the transform and the quantization performed in the transform and quantization unit 330. Specifically, the residual block reconstructer 270 may perform the inverse quantization and the inverse transform by using information (e.g. transform and quantization type information) on the transform and the quantization generated and transferred from the transform and quantization unit 330.

Further, the residual block reconstructer 270 reconstructs the residual block through the inverse quantization of inversely performing the quantization process of the spatial domain quantizer 320 for the first quantized block encoded into the spatial domain without performance of the secondary prediction. Specifically, the residual block reconstructer 270 may perform the inverse quantization by using information (e.g. quantization type information) on the quantization generated and transferred from the spatial domain quantizer 320.

Further, the residual block reconstructer 270 reconstructs the first residual block by reconstructing a quantized first residual block and inversely quantizing the quantized first residual block by using the information on the secondary predicted motion vector contained in the information related on the secondary prediction in an inverse manner of the secondary prediction with respect to the second quantized block generated through the performance of the secondary prediction. Specifically, the residual block reconstructer 270 may perform the inverse quantization by using information (e.g. quantization type information) on the quantization generated and transferred from the second residual block generator 250.

The adder 280 generates a reconstructed block by adding the predicted block generated in the predictor 220 to the first residual block reconstructed by the residual block reconstructer 270.

The frame memory 290 stores the block reconstructed in the adder 280, so that the stored block is used as a reference block for generation of the predicted block in performance of the intra prediction or the inter prediction.

Figure 6:
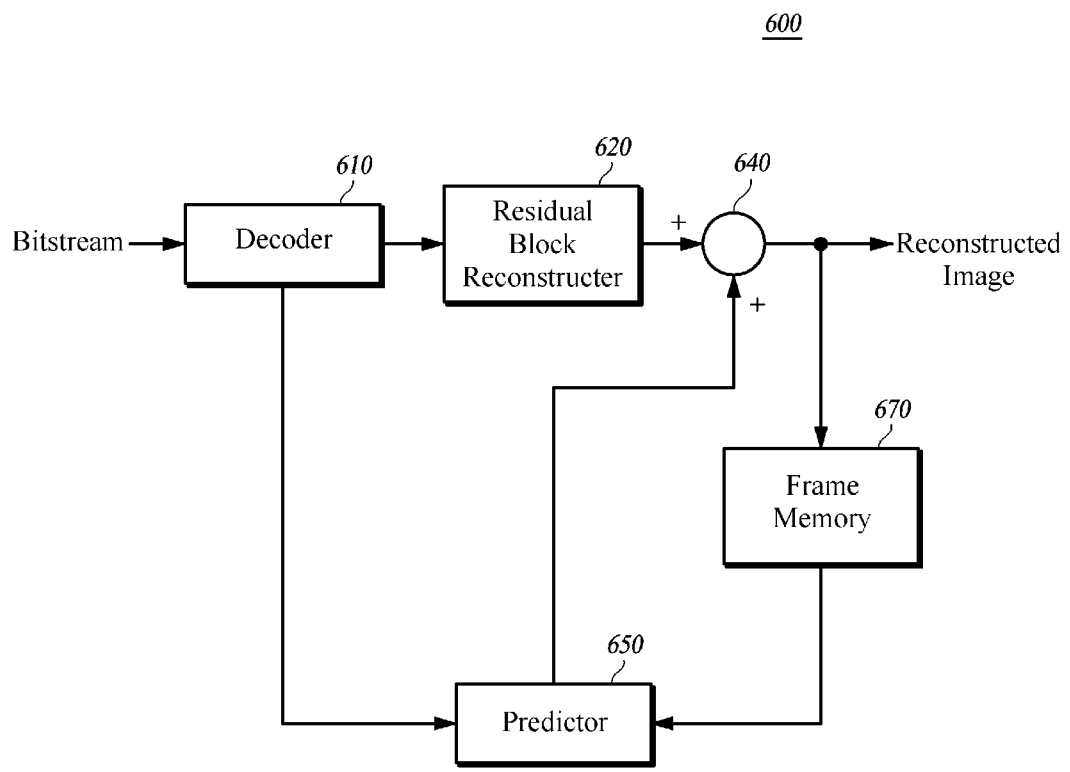
FIG. 6 is a block diagram illustrating a video decoding apparatus according to an embodiment of the present disclosure.

FIG. 6 is a block diagram illustrating a video decoding apparatus 600 according to an embodiment of the present disclosure.

As illustrated in FIG. 6, the video decoding apparatus 600 according to the embodiment of the present disclosure includes a decoder 610, a residual block reconstructer 620, an adder 640, a predictor 650, and a frame memory 670.

The decoder 610 decodes the quantized block, the information on whether the frequency transform is performed, and the information related to the secondary prediction from the bitstream.

The decoder 610 may decode or extract information necessary for a decoding, as well as the frequency transformed and quantized block or the quantized block quantized in the spatial domain by decoding the encoded data. The information necessary for the decoding refers to information necessary for a decoding of an encoded bit string within an encoded data (i.e. bitstream) and may include, for example, an information on a type of block, an information on a motion vector of a current block, an information on a type of transform and quantization, an information on whether a frequency transform is performed, an information on whether the secondary prediction is performed, an information on a secondary predicted motion vector, and other various information.

In other words, the decoder 610 may extract the quantized block including pixel information on the current block of the image by decoding the bitstream that is the encoded data by the video encoding apparatus 200 and transfer extracted information necessary for the prediction to the predictor 650.

The residual block reconstructer 620 reconstructs the residual block from the quantized block decoded by the decoder 610 by using the information on whether the frequency transform is performed, the information on whether the secondary prediction is performed within the information related to the secondary prediction, and the information on the secondary predicted motion vector contained in the information related to the secondary prediction.

Here, the information on whether the frequency transform is performed, the information on whether the secondary prediction is performed, and the information on the secondary predicted motion vector may be combined together, encoded into a binary data, and then included in the bitstream.

As illustrated in FIG. 5, the residual block reconstructer 620 decodes the pieces of information which have been combined, encoded into the binary data, and included in the bitstream. The residual block reconstructer 620 reconstructs the residual block by inversely quantizing and inversely transforming the quantized block when the information on whether the frequency transform is performed means "the frequency domain encoding", inversely quantizing the quantized block when the information on whether the secondary prediction is performed within the secondary prediction information means "non-performance of the secondary prediction" (in this event, the information on whether the frequency transform is performed means "the spatial domain encoding"), and decoding the information on the secondary predicted motion vector contained in the secondary prediction information when the information on whether the secondary prediction is performed within the secondary prediction information means "the performance of the secondary prediction" (in this event, the information on whether the frequency transform is performed means "the spatial domain encoding"), reconstructing the first residual block quantized from the decoded quantized block by using the decoded secondary predicted motion vector, and inversely quantizing the reconstructed first residual block. The inverse quantization and inverse transform method or the inverse quantization method by the residual block reconstructer 620 has been already described in the section of the description of the residual block reconstructer 270 of FIG. 2, so detailed descriptions will be omitted.

In the meantime, the secondary predicted motion vector may be one of the motion vector of the current block, motion vectors of neighboring blocks of the current block, an average of the motion vectors of the neighboring blocks of the current block, a motion vector of a previous frame at the same position as that of the current block, and a maximum probability motion vector.

The predictor 650 may generate a predicted block by determining the size and form of the current block according to the type of block identified by block type information and predicting the current block by using the motion vector of the current block identified by the information necessary for the prediction. In this case, the predictor 650 may generate the predicted block by the same or similar method to that of the predictor 220 of the video encoding apparatus 200.

The adder 640 reconstructs an original pixel value by adding the residual signal reconstructed by the residual block reconstructer 620 to the predicted pixel value generated by the predictor 650. The current block reconstructed by the adder 640 may be transferred to the frame memory 670 to be used for the prediction of another block in the predictor 650.

The frame memory 670 stores the reconstructed image which may be used for generating the intra predicted block and the inter predicted block.

The video encoding/decoding apparatus according to the embodiment of the present disclosure may be configured by connecting a bitstream output terminal of the video encoding apparatus 200 of FIG. 20 to a bitstream input terminal of the video decoding apparatus 600 of FIG. 6.

The video encoding/decoding apparatus according to the embodiment of the present disclosure includes a video encoder for generating a predicted block by predicting a current block, generating a first residual block by subtracting the predicted block from the current block, selectively frequency transforming the first residual block into a frequency transformed first residual block, generating a first quantized block for the first residual block or the frequency transformed first residual block, generating a second quantized block, if the first quantized block is a quantized first residual block from quantizing the first residual block, by selectively performing a secondary prediction on the quantized first residual block by using a secondary predicted motion vector set, encoding information on whether the frequency transforming is performed and selectively information on the secondary prediction, and encoding the first quantized block or the second quantized block into a bitstream; and a video decoder for decoding a quantized block, information on whether a frequency transform is performed and information related to a secondary prediction from a bitstream, reconstructing a residual block from the quantized block by using the information on whether the frequency transform is performed, information on whether the secondary prediction is performed and information on a secondary predicted motion vector within the information related to the secondary prediction, generating a predicted block by predicting a current block, and reconstructing the current block by adding a reconstructed residual block and the predicted block.

Here, the video encoder may be implemented with the video encoding apparatus 200 according to the embodiment of the present disclosure, and the video decoder may be implemented with the video decoding apparatus 600 according to the embodiment of the present disclosure.

Figure 7:
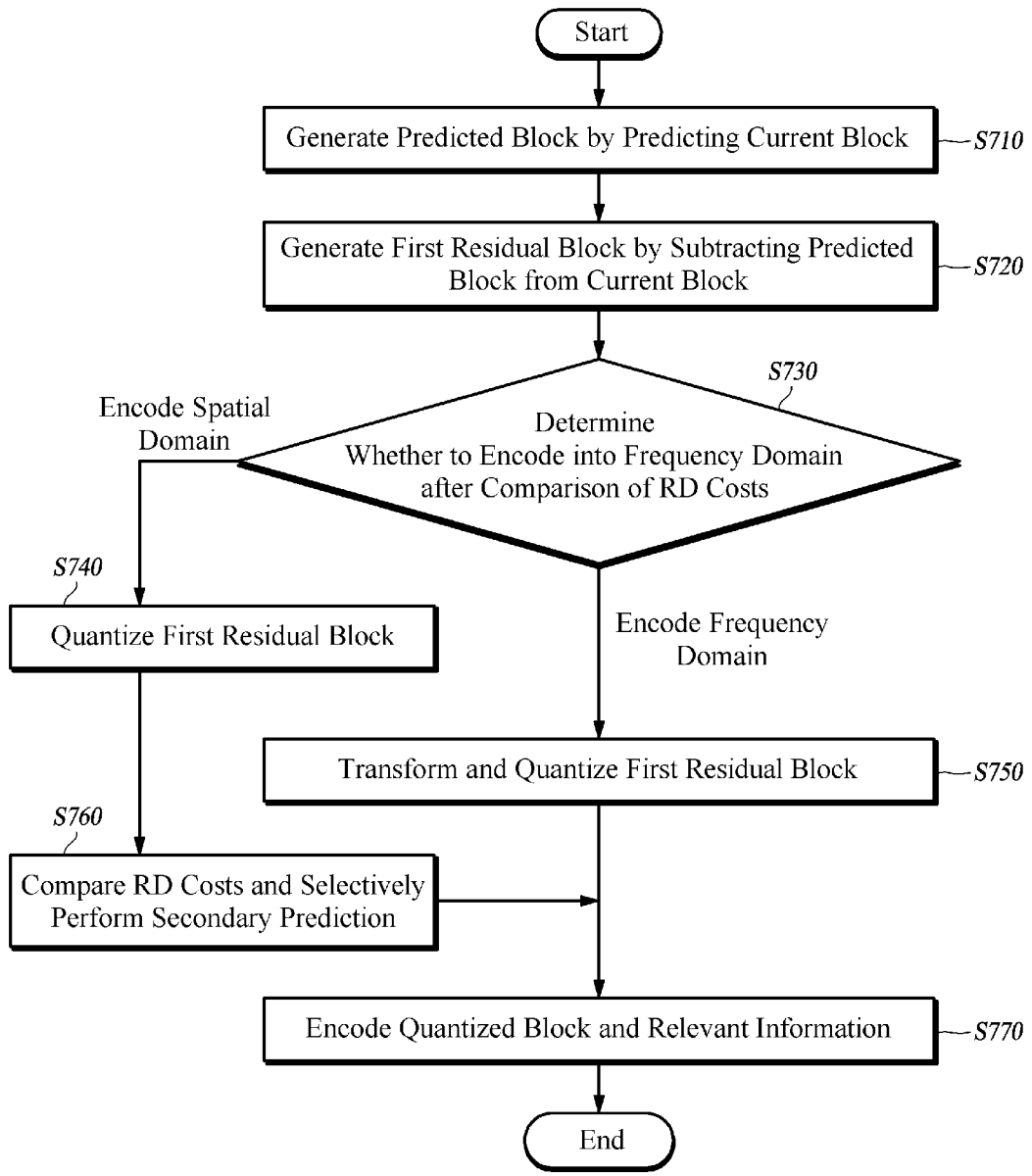
FIG. 7 is a flowchart illustrating a video encoding method according to an embodiment of the present disclosure.

FIG. 7 is a flowchart illustrating a video encoding method according to an embodiment of the present disclosure.

The video encoding method according to the embodiment of the present disclosure includes a prediction step S710 of generating a predicted block by predicting a current block, a first residual block generation step S720 of generating a first residual block by subtracting a predicted block from the current block, an adaptive transform determining step S730 of adaptively determining a transform by adaptively determining whether to encode the first residual block into a frequency domain or encode the first residual block into a spatial domain, a spatial domain quantization step S740 of performing a spatial domain quantization by quantizing the first residual block into the spatial domain as determined and generating a first quantized block, a transform and quantization step S750 of performing a transform and quantization by generating the first quantized block through performance of a frequency transform and a quantization on the first residual block into the frequency domain as determined, a second residual block generation step S760 of generating a second residual block by generating a second quantized block through selective performance of a secondary prediction on a quantized first residual block by using a secondary predicted motion vector set when the first quantized block is a block quantized from the first residual block, and an encoding step S770 of performing an encoding by encoding information on whether the frequency transform is performed, selectively encoding information on the secondary prediction, and encoding the first quantized block or the second quantized block.

Here, the prediction step S710 corresponds to the operation of the predictor 220, the first residual block generation step S720 to the operation of the first residual block generator 230, the adaptive transform determining step S730 to the operation of the adaptive transform determiner 310, the spatial domain quantization step S740 to the operation of the spatial domain quantizer 320, the transform and quantization step S750 to the operation of the transform and quantization unit 330, the second residual block generation step S760 to the operation of the second residual block generator 250, and the encoding step S770 corresponds to the operation of the encoder 260, so their detailed description will be omitted.

Figure 8:
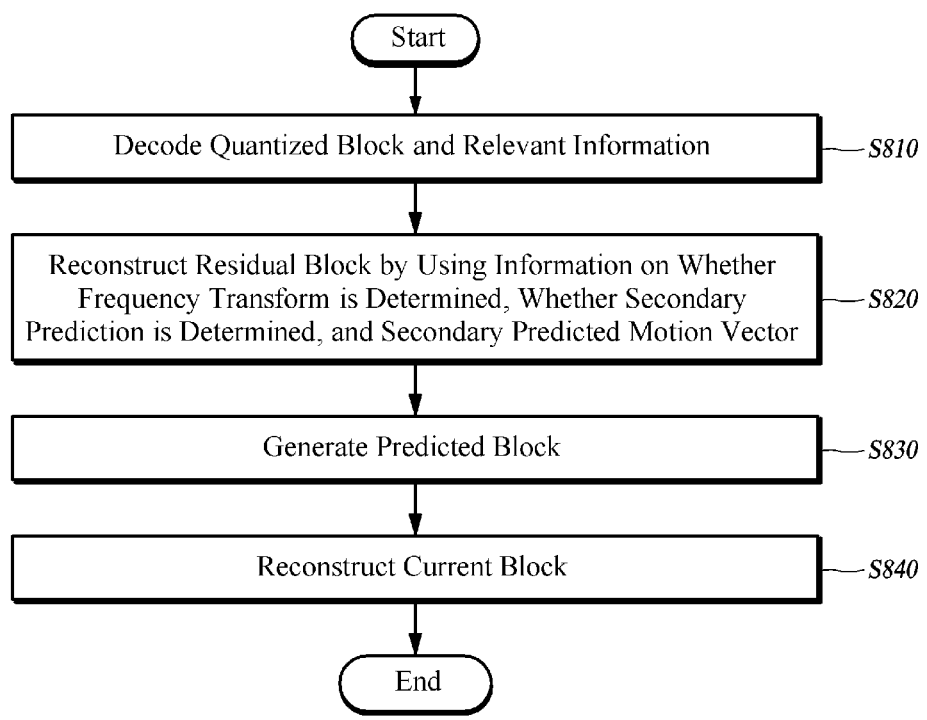
FIG. 8 is a flowchart illustrating a video decoding method according to an embodiment of the present disclosure.

FIG. 8 is a flowchart illustrating a video decoding method according to an embodiment of the present disclosure.

The video decoding method according to the embodiment of the present disclosure includes a decoding step S810 of decoding a quantized block, information on whether a frequency transform is performed, and information related to a secondary prediction from a bitstream, a residual block reconstruction step S820 of reconstructing a residual block from a decoded quantized block by using the information on whether the frequency transform is performed, information on whether the secondary prediction is performed within the information related to the secondary prediction, and information on a secondary predicted motion vector contained in the information related to the secondary prediction, a prediction step S830 of generating a predicted block through prediction of a current block, and an addition step S840 of reconstructing the current block by adding a reconstructed residual block to the predicted block.

Here, the decoding step S810 corresponds to the operation of the decoder 610, the residual block reconstruction step S820 to the operation of the residual block reconstructer 620, the prediction step S830 to the operation of the predictor 650, and the addition step S840 corresponds to the operation of the adder 640, so their detailed description will be omitted.

A video encoding/decoding method according to the embodiment of the present disclosure may be implemented through the combination of the video encoding method according to the embodiment of the present disclosure and the video decoding method according to the embodiment of the present disclosure.

The video encoding/decoding method according to the embodiment of the present disclosure includes encoding a video by generating a predicted block by predicting a current block, generating a first residual block by subtracting the predicted block from the current block, selectively frequency transforming the first residual block into a frequency transformed first residual block, generating a first quantized block for the first residual block or the frequency transformed first residual block, generating a second quantized block, if the first quantized block is a quantized first residual block from quantizing the first residual block, by selectively performing a secondary prediction on the quantized first residual block by using a secondary predicted motion vector set, encoding information on whether the frequency transforming is performed and selectively information on the secondary prediction, and encoding the first quantized block or the second quantized block into a bitstream; and decoding a video by decoding a quantized block, information on whether a frequency transform is performed and information related to a secondary prediction from a bitstream, reconstructing a residual block from the quantized block by using the information on whether the frequency transform is performed, information on whether the secondary prediction is performed and information on a secondary predicted motion vector within the information related to the secondary prediction, generating a predicted block by predicting a current block, and reconstructing the current block by adding a reconstructed residual block and the predicted block.

The aforementioned video encoding/decoding method according to the embodiment of the present disclosure, the aforementioned video encoding method according to the embodiment of the present disclosure, and the aforementioned video decoding method according to the embodiment of the present disclosure may be implemented through a computer readable recoding medium including a program instruction for performing various operations executed through a computer. A computer readable recording medium for recording a program for implementing the video encoding/decoding method according to the embodiment of the present disclosure, the video encoding method according to the embodiment of the present disclosure, and the video decoding method according to the embodiment of the present disclosure include all types of recording devices in which a data readable by a computer system is stored. An example of the computer readable recording medium includes ROM, RAM, CD-ROM, magnetic disks, floppy disks, optical data storing devices, etc., and also includes carrier waves medium (e.g. transmission through the Internet). Further, the computer readable recording medium may be distributed in a computer system connected through a network, to store and execute a computer readable code through a distribution method. Further, functional programs, codes, and code segments for implementation of the embodiment of the present disclosure may be easily conceived by programmers in a technical field to which the embodiment of the present disclosure pertains.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure should be construed by the appended claims, and all technical spirits belonging to the scope equal to that of the claims should be construed to be included in the scope of a right of the present disclosure.

INDUSTRIAL APPLICABILITY

As described above, the present disclosure is highly useful for application in the fields of video data compression technology, by minimizing a value of the generated residual signal by adaptively performing the selective secondary prediction by using the prediction errors of the previously encoded block in performance of the encoding into the spatial domain, as well as adaptively determining the frequency transform after the generation of the residual signal in predicting a current block of an image from a reference block and encoding and decoding the current block, thereby improving the compression efficiency and thus improving a subjective/objective image quality.

The invention claimed is:

1. A video encoding apparatus, comprising:
a predictor configured to generate a predicted block of a current block by using a first motion vector of the current block;
a first residual block generator configured to generate a first residual block by subtracting the predicted block from the current block;
an adaptive transform-quantization unit configured to choose to perform one of the following operations to generate a first quantized block of the current block:

(i) performing a frequency transform of the first residual block into a frequency transformed first residual block and quantizing the frequency transformed first residual block to generate a frequency domain first quantized block, the first quantized block of the current block being set as the frequency domain first quantized block, and (ii) quantizing the first residual block to generate a spatial domain first quantized block of the current block, the first quantized block of the current block being set as the spatial domain first quantized block of the current block;

a second residual block generator configured to choose to perform one of the following operations to generate a quantized block to be encoded:

(a) generating a second quantized block by performing a secondary prediction on the spatial domain first quantized block of the current block by using a spatial domain first quantized block of a reference block, the reference block corresponding to a neighboring motion vector of the current block, the quantized block to be encoded being set as the second quantized block, and (b) skipping the performing of the secondary prediction, the quantized block to be encoded being set as the first quantized block; and an encoder configured to encode the quantized block to be encoded, encode a first information indicating whether the frequency transform is performed on the first residual block based on the choosing, and encode a second information indicating whether the secondary prediction is performed on the spatial domain first quantized block, when the first residual block has been frequency-transformed into a frequency transformed first residual block.

2. The video encoding apparatus of claim 1, wherein the adaptive transform-quantization unit comprises:

an adaptive transform determiner configured to determine whether to encode the first residual block in a frequency domain or a spatial domain;

a spatial domain quantizer configured to generate the first quantized block by quantizing the first residual block into the spatial domain first quantized block, when the first residual block is determined to be encoded in the spatial domain; and a transform-quantization unit configured to generate the first quantized block by performing the frequency transform and quantizing the frequency transformed first residual block into the frequency domain first quantized block, when the first residual block is determined to be encoded in the frequency domain.

3. The video encoding apparatus of claim 1, wherein a determination whether the secondary prediction is performed is made based on a difference between pixel values of a spatial domain first quantized block of a block of a previous frame and the spatial domain first quantized block of the current block.

4. The video encoding apparatus of claim 1, wherein the first information, the second information, and information on the neighboring motion vector used for the secondary prediction are combined together into a binary data and encoded.

5. The video encoding apparatus of claim 1, wherein the neighboring motion vector includes one of, motion vectors of neighboring blocks of the current block, and a motion vector of a previous frame block, a position of the previous frame block is determined according to a location of the current block.

6. A video decoding apparatus, comprising:

a decoder configured to obtain a first motion vector of a current block from a bitstream, and obtain, from the bitstream, residual signals and a first information for indicating whether an inverse frequency transform is applied to the residual signals;

a residual block reconstructer configured to reconstruct a residual block from the residual signals by inversely quantizing the obtained residual signals and skipping the inverse frequency transform for the inversely quantized residual signals, when the first information indicates skipping of the inverse frequency transform, and inversely quantizing the obtained residual signals and inversely frequency-transforming the inversely quantized residual signals, when the first information indicates non-skipping of the inverse frequency transform;

a predictor configured to generate a predicted block by predicting the current block based on the obtained first motion vector; and an adder configured to add each pixel value of the reconstructed residual block to a corresponding pixel value of the predicted block to thereby reconstruct the current block.

7. The video decoding apparatus of claim 6, wherein the residual block reconstructer is configured to perform inversely quantizing and inversely transforming on the obtained residual signals when the first information indicates "frequency domain encoding", and perform inversely quantizing on the obtained residual signals when the first information indicates "spatial domain encoding".

8. The video decoding apparatus of claim 6, wherein the first information and the first motion vector are combined together into a binary data included in the bitstream.

9. The video decoding apparatus of claim 6, wherein, when the first information indicates skipping of the inverse frequency transform, the decoder is further configured to obtain a second information from the bitstream, and the residual block reconstructer is further configured to generate a second residual block by performing a secondary prediction on the inversely quantized residual signals by using an inversely quantized residual signals of a reference block when the second information indicates non-skipping of the secondary prediction, the reference block corresponding to a secondary predicted motion vector, the residual block being set as the second quantized block, wherein the secondary predicted motion vector is one of motion vectors of neighboring blocks of the current block, and a motion vector of a previous frame block, a position of the previous frame block being determined according to a location of the current block, and skip the performing of the secondary prediction when the second information indicates skipping of the secondary prediction, the residual block being set as the inversely quantized residual signals.

10. A video encoding method, comprising:

generating a predicted block of a current block by using a first motion vector of the current block;

generating a first residual block by subtracting the predicted block from the current block;

choosing to perform one of the following operations to generate a first quantized block of the current block:
  (i) performing a frequency transform of the first residual block into a frequency transformed first residual block and quantizing the frequency transformed first residual block to generate a frequency domain first quantized block, the first quantized block of the current block being set as the frequency domain first quantized block, and
  (ii) quantizing the first residual block to generate a spatial domain first quantized block of the current block, the first quantized block of the current block being set as the spatial domain first quantized block of the current block;
choosing to perform one of the following operations to generate a quantized block to be encoded:
  (a) generating a second residual block by performing a secondary prediction on the spatial domain first quantized block of the current block by using a spatial domain first quantized block of a reference block, the reference block corresponding to a neighboring motion vector of the current block, the quantized block to be encoded being set as the second quantized block, and
  (b) skipping the performing of the secondary prediction, the quantized block to be encoded being set as the first quantized block; and
encoding the quantized block to be encoded,
encoding a first information indicating whether the frequency transform is performed on the first residual block based on the choosing and
encoding a second information indicating whether the secondary prediction is performed on the spatial domain first quantized block, when the first residual block has been frequency-transformed into a frequency transformed first residual block.

11. The video encoding method of claim 10, wherein the process of choosing to perform one of the following operations to generate the first quantized block comprises:
  determining whether to encode the first residual block in a frequency domain or a spatial domain;
  generating the first quantized block by quantizing the first residual block into the spatial domain first quantized block, when the first residual block is determined to be encoded in the spatial domain; and
  generating the first quantized block by performing the frequency transform and quantizing the frequency transformed first residual block into the frequency domain first quantized block, when the first residual block is determined to be encoded in the spatial domain.

12. The video encoding method of claim 10, wherein a determination whether the secondary prediction is performed is made based on a difference between pixel values of a spatial domain first quantized block of a block of a previous frame and the spatial domain first quantized block of the current block.

13. The video encoding method of claim 10, wherein the neighboring motion vector includes one of motion vectors of neighboring blocks of the current block, and a motion vector of a previous frame block, a position of the previous frame block is determined according to a location of the current block.

14. A video decoding method, comprising:
  obtaining a first motion vector of a current block from a bitstream, and
  obtaining, from the bitstream, residual signals and a first information for indicating whether an inverse frequency transform is applied to the residual signals;
  reconstructing a residual block from the residual signals by
    inversely quantizing the obtained residual signals and skipping the inverse frequency transform for the inversely quantized residual signals, when the first information indicates skipping of the inverse frequency transform, and
    inversely quantizing the obtained residual signals and inversely frequency-transforming the inversely quantized residual signals, when the first information indicates non-skipping of the inverse frequency transform;
  generating a predicted block by predicting the current block based on the obtained first motion vector; and
  adding each pixel value of the reconstructed residual block to a corresponding pixel value of the predicted block to thereby reconstruct the current block.

15. The video decoding method of claim 14, wherein the reconstructing of the residual block comprises:
  performing inversely quantizing and inversely transforming on the obtained residual signals when the first information indicates "frequency domain encoding", and
  performing inversely quantizing on the obtained residual signals when the first information indicates _"spatial domain encoding".

16. The video decoding method of claim 14, wherein the first information and the first motion vector are combined together into a binary data included in the bitstream.

17. The video decoding method of claim 14, wherein, when the first information indicates skipping of the inverse frequency transform,
  the method further comprises obtaining a second information from the bitstream, and
  the reconstructing of the residual block further comprises:
    generating a second residual block by performing a secondary prediction on the inversely quantized residual signals by using an inversely quantized residual signals of a reference block when the second information indicates non-skipping of the secondary prediction, the reference block corresponding to a secondary predicted motion vector, the residual block being set as the second quantized block, wherein the secondary predicted motion vector is one of motion vectors of neighboring blocks of the current block, and a motion vector of a previous frame block, a position of the previous frame block being determined according to a location of the current block, and
    skipping the performing of the secondary prediction when the second information indicates skipping of the secondary prediction, the residual block being set as the inversely quantized residual signals.

* * * * *